United States Patent [19]

Oklobdzija et al.

[11] Patent Number: 4,714,994
[45] Date of Patent: Dec. 22, 1987

[54] INSTRUCTION PREFETCH BUFFER CONTROL

[75] Inventors: Vojin G. Oklobdzija, Putnam County; Daniel T. Ling, Westchester County, both of N.Y.

[73] Assignee: International Business Machines Corp., Armonk, N.Y.

[21] Appl. No.: 728,724

[22] Filed: Apr. 30, 1985

[51] Int. Cl.$^4$ .............................................. G06F 9/38
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,401,376 | 9/1968 | Barnes et al. | 364/200 |
| 3,551,895 | 12/1970 | Driscoll | 364/200 |
| 3,764,988 | 10/1973 | Onishi | 364/200 |
| 3,967,247 | 6/1976 | Andersen | 364/200 |
| 4,099,229 | 7/1978 | Kancler | 364/200 |
| 4,403,284 | 9/1983 | Sacarisen | 364/200 |
| 4,583,163 | 4/1986 | Kobayashi et al. | 364/200 |

Primary Examiner—David Y. Eng
Attorney, Agent, or Firm—C. Lamont Whitham

[57] ABSTRACT

An instruction prefetch buffer control (20) is provided for an instruction prefetch buffer array (10) which stores the code for a number of instructions that have already been executed as well as the code for a number of instructions yet to be executed. The instruction prefetch buffer control includes a register (201) for storing an instruction fetch pointer, this pointer being supplied to the buffer array (10) as a write pointer which points to the location in the array where a new word is to be written from main memory. A second register (205) stores an instruction execution pointer which is supplied to the buffer array (10) as a read pointer. A first adder (203) increments the first register to increment the instruction fetch pointer for sequential instructions and calculates a new instruction fetch pointer for branch instructions. A second adder (215) increments the second register to increment the instruction execution pointer for sequential instructions and calculates a new instruction execution pointer for branch instructions. Incrementing of the second register is variable depending on the length of the instruction. A third adder (221) is responsive to the output of the first adder and a branch target address to calculate whether the target instruction is contained in the array (10) and, if it is, causes the new instruction execution pointer calculated by the second adder (215) to be loaded into the second register (205).

8 Claims, 9 Drawing Figures

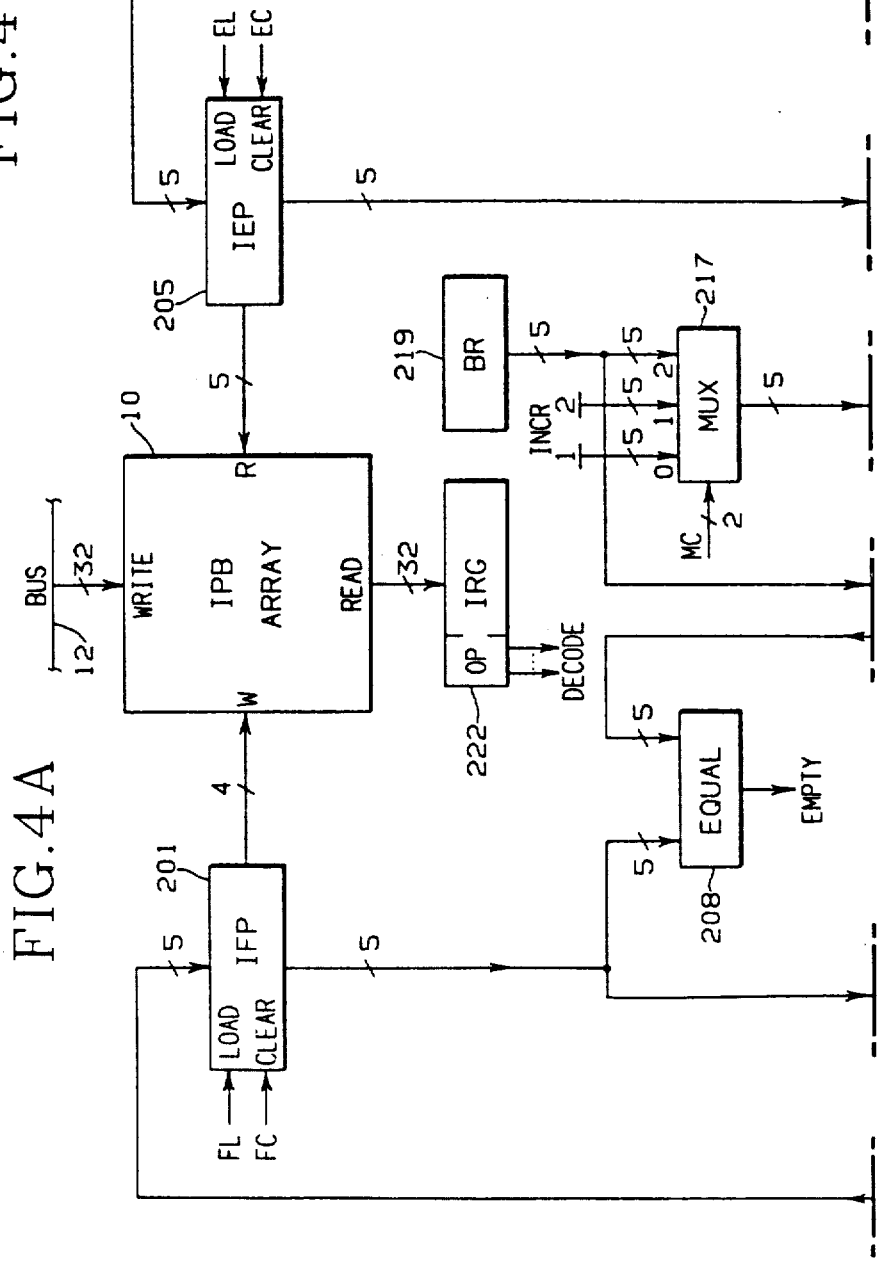

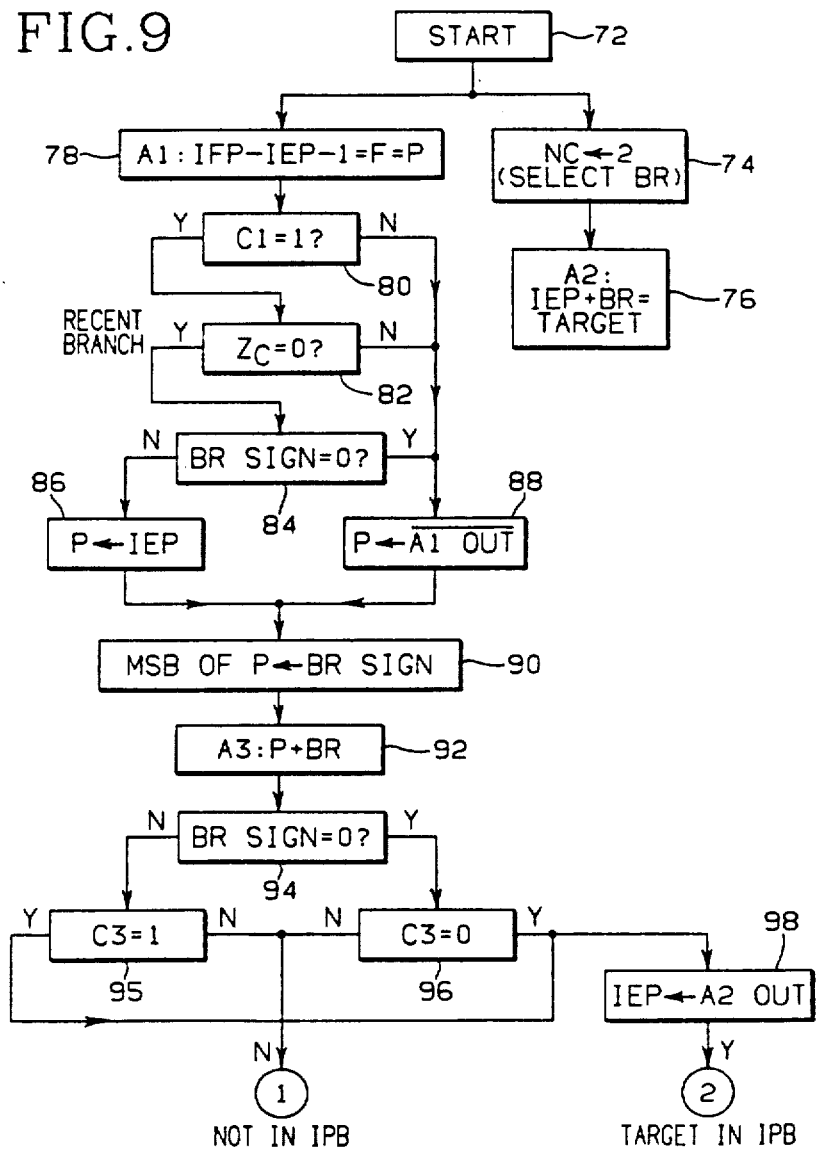

INSTRUCTION PREFETCH BUFFER CONTROL

CROSS REFERENCE TO RELATED APPLICATION

The invention disclosed herein is related in subject matter to the invention disclosed in copending patent application Ser. No. 06/713,217 filed Mar. 18, 1985, by Vojin G. Oklobdzija which is assigned to the assignee of this application. The disclosure of said application Ser. No. 06/713,217 is incorporated herein by reference.

TECHNICAL FIELD

The subject invention is directed to an instruction prefetch buffer for a microprocessor and, more particularly, to such a prefetch buffer control which handles short loops and short forward references.

DESCRIPTION OF THE PRIOR ART

The usual implementation of an instruction prefetch buffer (IPB) can degrade processor performance in a number of important situations. Consider for example a pipelined processor. As normally implemented, each successful branch will cause the IPB to be cleared and a new instruction fetch to start from the target address. This leads to a penalty of several cycles depending on the depth of the pipe and the length of the target instruction being loaded and executed. Since successful branches constitute about 15% of all instructions, the impact on overall system performance can be significant. Further, consider a processor where most instructions execute in one cycle and where there is only a single data path to memory for both data and instructions. Code which contains a large percentage of load and store instructions will tend to empty the IPB because the memory bandwidth is used to move data. Cycles will thus be lost since instruction fetches cannot be overlapped with other operations. This situation is most apt to occur in loops of the very important move character subroutine.

In the instance where a program is looping in a short loop n-times and having k-cycles lost during each passage through the loop, a total of k*n cycles will be lost, where the asterisk denotes multiplication. Such a loop is diagramatically illustrated in FIG. 1 of the drawings. Statistics obtained from a simulator executing typical instruction streams show that short branches are quite frequent. Specifically, 20 to 30% of the successful branches are associated with short backward loops (less than 64 bytes long), and 10 to 20% are associated with short forward branches (less than 16 bytes).

SUMMARY OF THE INVENTION

It is therefore an object of the present invention to provide an instruction prefetch buffer control capable of handling short loops and short forward references to statistically lower the miss rate of instructions stored in the instruction prefetch buffer.

It is another object of the invention to provide an instruction prefetch buffer control which allows a processor to execute short loops directly from the buffer, the size of the buffer being determined by a statistical analysis of typical instruction streams.

According to this invention, the instruction prefetch buffer is implemented as a one-port-write, two-port-read register stack as disclosed in the aforementioned copending patent application Ser. No. 06/713,217 filed by Vojin G. Oklobdzija. The key to the present invention is the control of two IPB pointers referred to herein as the instruction fetch pointer (IFP) and the instruction execution pointer (IEP). The IFP points to the location in the IPB where the next instruction fetched will be placed, while the IEP points to the the location in the IPB where the next instruction to be executed is located. The pointers allow the detection of branch targets within the IPB and permit the execution of a target instruction located within the IPB without first clearing the IPB or initiating a new instruction fetch. When a backward or forward reference is encountered, it is determined by simple hardware whether this instruction is contained in the IPB or not. If the instruction referenced is outside the IPB, both pointers, IEP and IFP, are set to the same location and the target instruction referenced is fetched from memory into the IPB. The pointers are also controlled so that in a steady state condition the buffer contains the code for a number of instructions that have already been executed as well as the code for a number of instructions yet to be executed. For example, in the case of a 64-byte IPB macro, 48 bytes of code or approximately sixteen instructions that have been executed and 16 bytes of code or approximately five instructions yet to be executed are stored in the IPB in a steady state condition. For the purposes of the description of the invention, it is assumed that the rate of instruction fetch into the IPB always exceeds the rate of instruction execution because there will be multi-cycle instructions as well as half-word instructions. Every fetch brings four bytes to the IPB which is 1.5 instructions on the average. In this case, the number of instructions yet to be executed will tend to grow and, in a circular IPB, the instructions already executed will be steadily overwritten. In order to preserve the recently executed portions of the program to be used for short backward references, the rate at which the pointer IFP advances should be limited and coupled to the pointer IEP. This is achieved by hardware according to a preferred embodiment of the invention. Additional hardware also detects whether the IPB has recently been cleared by the occurance of a branch out of the IPB. In that case, the IEP register is cleared to zero.

BRIEF DESCRIPTION OF THE DRAWINGS

The foregoing and other objects, aspects and advantages of the invention will be better understood from the following detailed description of the invention with reference to the drawings, in which:

FIG. 9 is a flow chart of the process called in the flow chart of FIG. 7 to determine whether the target is in the instruction prefetch buffer.

DETAILED DESCRIPTION OF A PREFERRED EMOBODIMENT OF THE INVENTION

Figure 2:
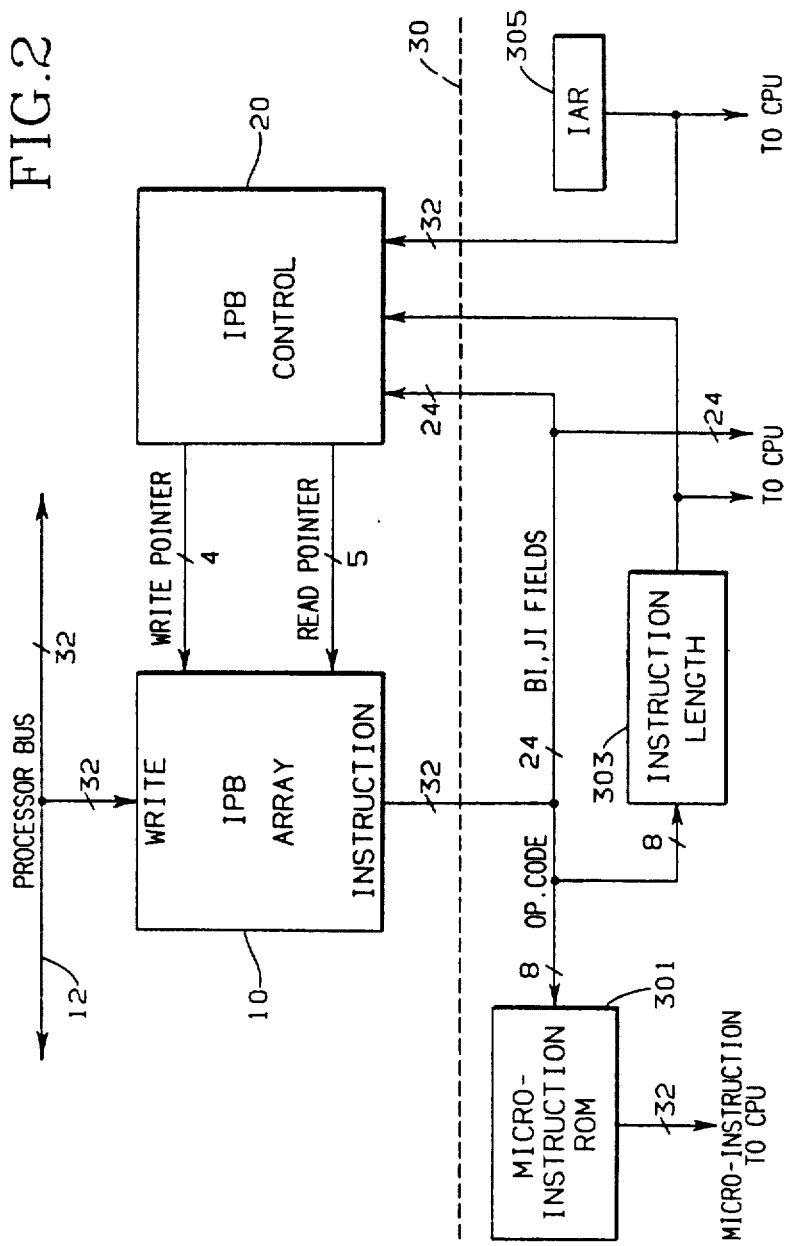
FIG. 2 is a block diagram showing the relationship of the instruction prefetch buffer array, the instruction prefetch buffer control and the central processing unit of the microprocessor.

Referring now to the drawings, and more particularly to FIG. 2, there is shown a portion of a microprocessor including an instruction prefetch buffer (IPB) array 10, an IPB control 20 and the interface connections to the central processing unity (CPU) of the microprocessor. These latter connections are delineated by the dotted line bearing the reference numeral 30. Thus, it will be understood that while the CPU forms no part of the invention, enough of the interface is shown below the dotted line 30 to teach one skilled in the art how the instruction prefetch buffer and its control function with the CPU.

Explaining in greater detail, in a preferred embodiment, the IPB array 10 is connected to a 32-bit wide processor bus 12 over which instructions are supplied to the IPB array 10 from a random access memory (RAM), not shown. In the drawing, the thirty-two lines of the bus 12 are indicated with a slash and the numeral "32" adjacent, and this convention is used throughout the various figures. Instructions are written into the IPB array 10 under the control of the IPB control 20 by means of a 4-bit write pointer, and instructions are read out of the IPB array 10 also under the control of the IPB control 20 by means of 5-bit read pointer. The 32 bits which are read out of the IPB array 10 include 8 bits of operation (OP) code, the remaining 24 bits comprising branch instruction (BI) and jump instruction (JI) fields. The 8-bit OP code is supplied to a microinstruction read only memory (ROM) 301. This 8-bit OP code serves as an address to select a 32-bit microinstruction which is transmitted to the CPU. This is conventional and well understood in the art. The 8-bit OP code is also supplied to an instruction length decoder 303, the output of which is supplied to both the CPU and the IPB control 20. As will be explained is more detail, the IPB array 10 is capable of handling variable length instructions, 16-bits or 32-bits in the preferred embodiment. Thus, it is necessary to provide an instruction length decoder 303 to recognize the length of the instruction which has been read out of the IPB array 10. Also, the 24-bit portion of the 32 bits read out of the IPB array 10 which comprises the BI and JI fields is supplied to both the CPU and the IPB control 20. The 32-bit instruction address from tne instruction address register (IAR) 305 is supplied to both the CPU and the IPB control 20. Thus, the IPB control 20 receives as inputs 24 bits from the 32 bits read out of the IPB array 10, the decoded instruction length and the instruction address. From this information, the IPB control 20 generates the 4-bit write and the 5 bit read pointers.

Figure 3:
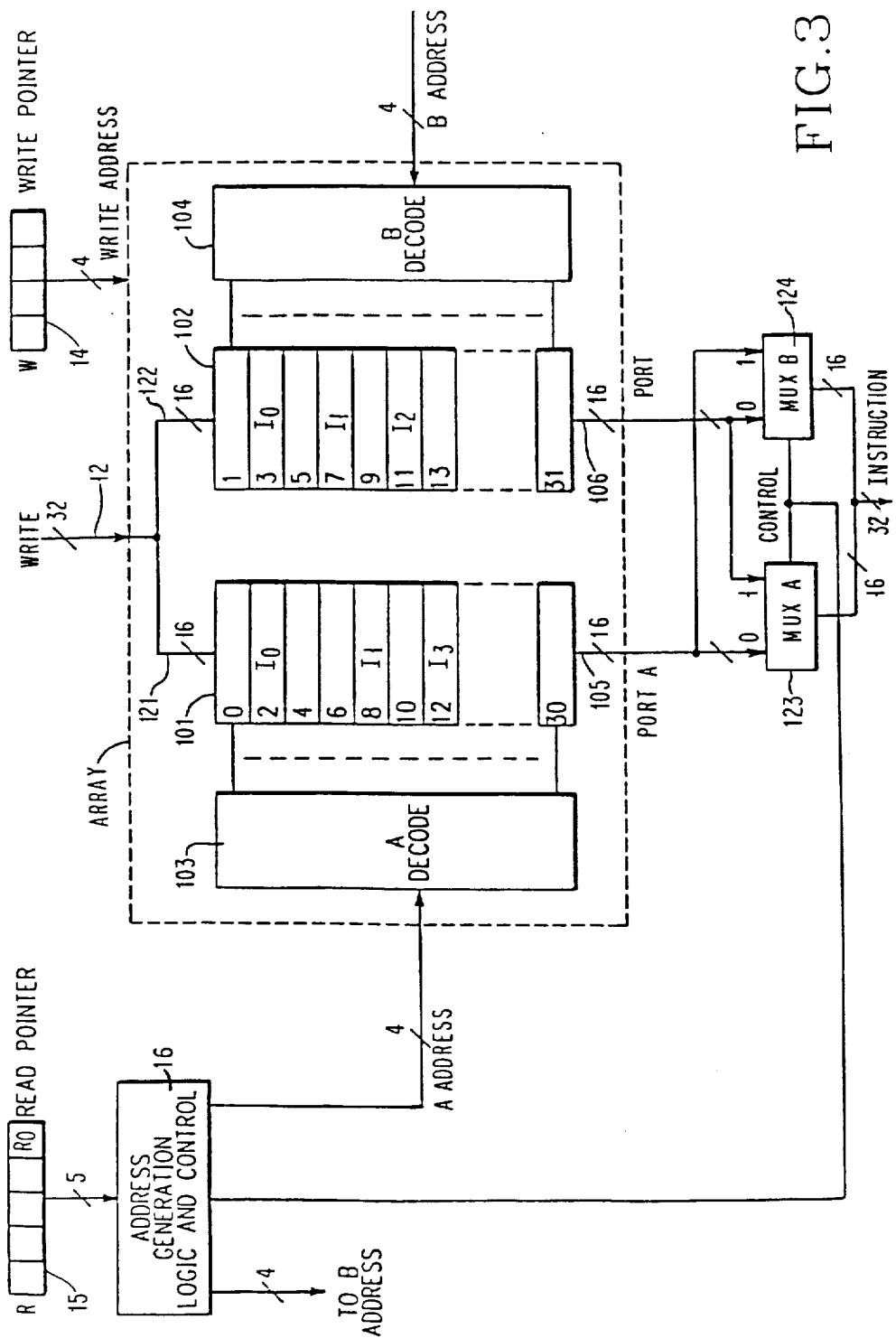
FIG. 3 is a block diagram showing the register selection mechanism and organization of the intruction prefetch buffer array shown in FIG. 2.

Before describing the IPB control 20, a brief description of the IPB array 10 is first presented with reference in FIG. 3 so that a better understanding of the function of the IPB control may be had. The IPB array 10 is tne subject of the above referencdd copending patent application Ser. No. 06/713,217 of Vojin G. Oklobdzija. In the preferred embodiment, the IPB array 10 is implemented as a 32-bit one-port-write and 16-bit two-port-read array. More specifically, the array 10 comprises and even array 101, referred to herein as the A array, and an odd array 102, referred to herein as the B array. Associated with the A array 101 is an address decoding network 103. A corresponding address decoding network 104 is associated with the B array 102. the A array 101 is addressed with even address values, while the B array 102 is addressed with odd address values. Each array 101 and 102 is shown as capable of storing 16 half words (16 bits) for a total of 32 half words, but those skilled in the art will understand that this is but one specific example. The principles are equally applicable to larger or smaller arrays and could be extended to byte fields (8 bits) and double word fields (64 bits).

As indicated in FIG. 3, instruction I is a 32-bit instruction beginning at an even address in the A array 101 and continuing over to an odd address in the B array 102. Instruction I is another 32-bit instruction, but this instruction begins at an odd address in the B array 102 and continues to an even address in the A array 101. Instruction $I_2$ is an example of a 16-bit instruction which begins at an odd address and is totally contained in the B array 102, while instruction $I_3$ is another 16-bit instruction contained in the A array 101. Specific examples of instruction formats are given in the above referenced copending patent application Ser. No. 06/713,217. What should be understood here is that one word (32 bits) is fetched at a time from main memory or RAM and written into the IPB array 10 via the processor bus 12. Since different length instructions are used, an instruction can be anywhere within 2-byte boundaries, and the problem is to extract the instructions one at a time however they might be distributed within the boundaries of the array.

The 32-bit bus 12 is split into two 16-bit buses 121 and 122 in the array 10 with bus 121 supplying the A array 101 with the first two bytes of the word fetched from RAM to be written in that array and bus 122 supplying the B array 102 with the second two bytes of the same word to be written in that array. Register 14 temporarily stores the write pointer W from the IPB control 20 which points to the 32-bit location where a new word is to be written. The 32-bit location is obtained by combining both 16-bit registers A and B from the array 10 and addressing them as one 32-bit register. Thus, write address W addresses the A array address A and the B array address B and so forth. Therefore, the W pointer is only four bits long.

Register 15 temporarily stores the read pointer R from the IPB control 20 which points to the 32-bit location from where the instruction is to be read. The 5-bit read pointer R is supplied to the address generation and control logic 16. This logic generates the 4-bit addresses for each of the arrays 101 and 102. Specifically, the 4-bit A address is supplied to the A decoder 103 and the 4-bit B address is supplied to the B decoder 104. The output of the A array 101 is supplied via a first 16-bit output bus 105 to port A, and the output of the B array 102 is supplied via a second 16-bit output bus 106 to port B.

In order to have the instructions read out of the array 10 aligned, the beginning of the instruction has always to be read from the multiplexer 123 whether the instruction is a 16-bit instruction or a 32-bit instruction. Also, to access a 32-bit instruction from the array, both sides of the array, odd and even, have to be addressed and data brought to ports A and B. But as already described, a 16-bit portion containing the beginning of the instruction may be either in the A array 101 or the B array 102; i.e., 32-bit instructions can start in either array. Therefore, multiplexers 123 and 124 are provided to read the instructions out of the array 10 in the proper order. The two 16-bit inputs of each multiplexer 123 and 124 are each connected to the 16-bit ports A and B of the array 10 but in the opposite order from each other. The 16-bit outputs of the multiplexers 123 and 124 are combined to provide a 32-bit instruction output. In the case of a 16-bit instruction, the high order 16 bits comprise a null field and are simply disregarded.

Figure 1:
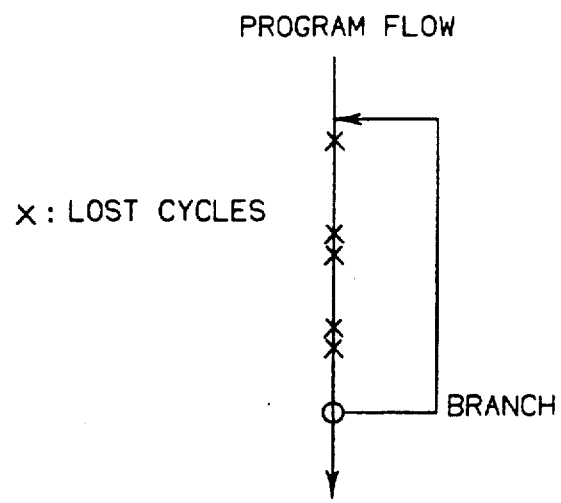
FIG. 1 is a diagramatical illustration of a short loop in a program indicating the loss of cycles when using conventional instruction prefetch buffers.
Figure 6:
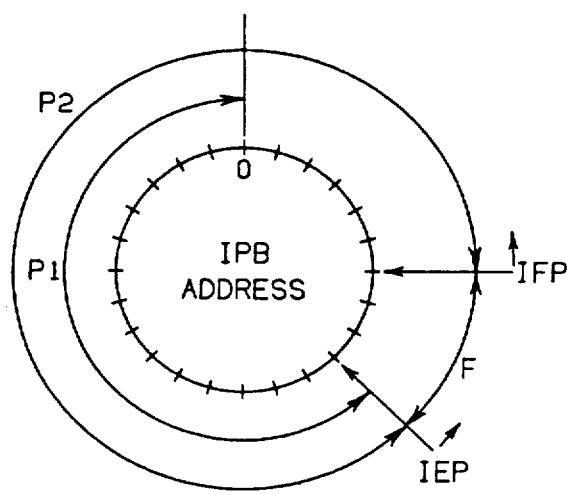
FIG. 6 is a diagram representing a circular instruction prefetch buffer showing the relative location of the instruction fetch pointer and the instruction execution pointer.
Figure 4B:
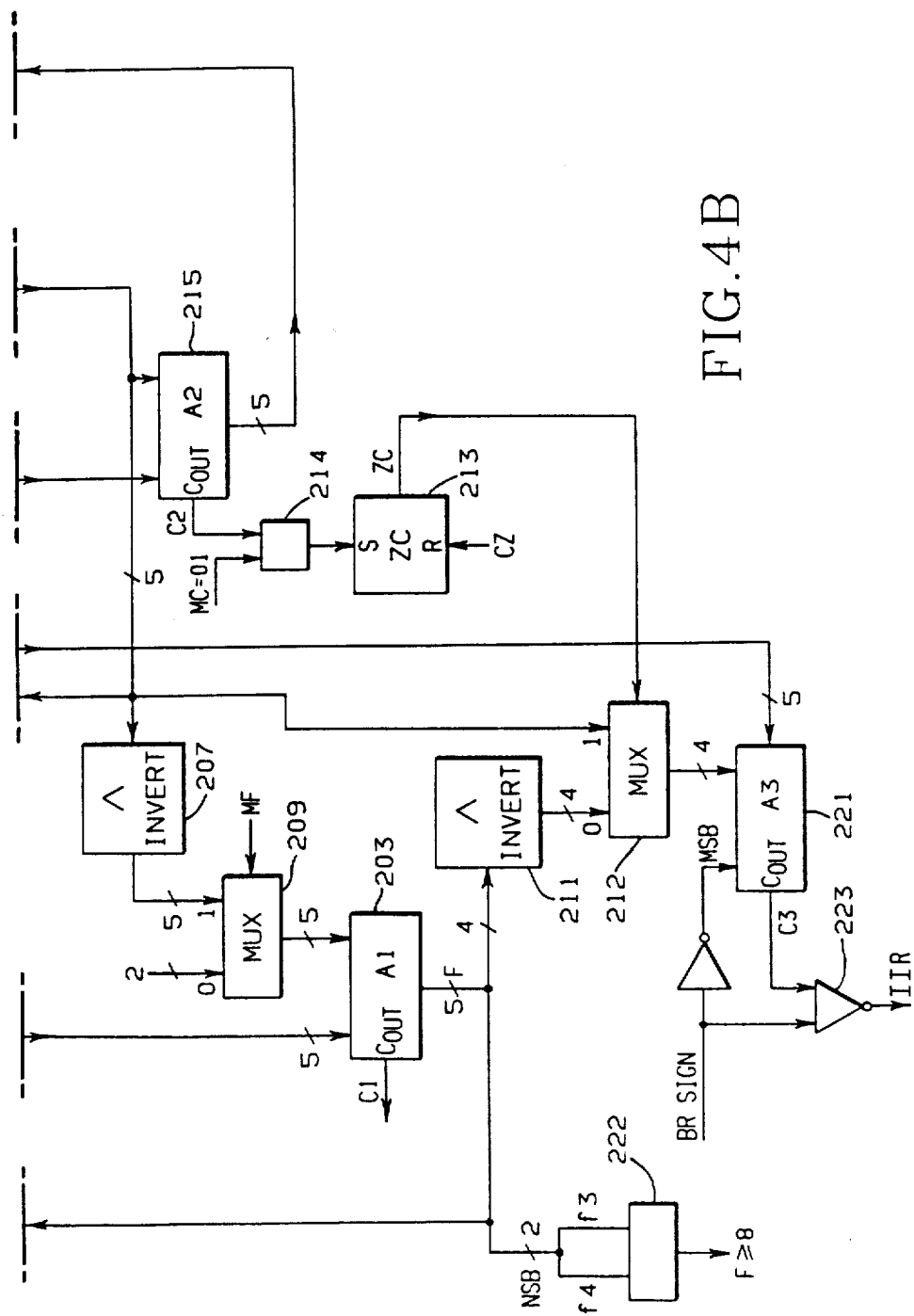
FIG. 4 is a diagram showing the relationship of FIGS. 4a and 4B which, taken together, are a block diagram showing the instruction prefetch buffer control according to the present invention.

The subject invention relates to the IPB control 20 which supplies the write pointer W and the read pointer R to the IPB array 10. An implementation of the invention is illustrated in FIG. 4. The instruction fetch pointer (IFP) is loaded in a register 201, and the adder 203 is used to increment the IFP. The IFP is incremented every time a new instruction is written into the IPB array 10. Since the IFP points to 32-bit boundaries, it is incremented by two every time. The four most significant bits or the IFP are used as a write pointer W for the IPB array 10. The instruction execution pointer (IEP) is loaded in a register 205. The five bits of the IEP are used as a read pointer R for the IPB array 10. The load signals FL and EL are used to load new values of IFP and IEP into registers 201 and 205, respectively. The clear signals FC and EC are used to clear the registers. These clear signals occur when a branch or jump is out of range requiring the loading and reading of instructions to start from the beginning. The pointers IFP and IEP are diagramatically illustrated in FIG. 6 which illustrates the relative positions of the pointers with reference to IPB address space. FIG. 6 is referred to in the discussion which follows to illustrate the function of the invention.

Referring now back to FIG. 4, in addition to incrementing the IFP register 201, the adder 203 is used for branches to calculate the difference F between IFP and IEP, which difference represents the number of instructions that have been written into the IPB but have yet to be encountered by the IEP as shown in FIG. 6. However, this number is actually for one smaller than the difference because the position pointed to by the IFP does not yet contain the new instruction. This fact facilitates the hardware implementation because 1's complement addition (subtraction) gives the expected result. The implementation requires only that IEP be inverted before it is fed into adder 203. Thus, the IEP contained in register 205 is inverted by inverter 207 and supplied to the other input of adder 203 via the multiplexer 209. Performing 1's complement (inversion) in complementing logic 211 of the output F of adder 203 gives a value P which represents the number of instructions between the pointers IEP and IFP which are the instructions accumulated in the IPB array 10 but not yet overwritten by new instruction fetches. However, as illustrated in FIG. 6, the proper interpretation of the value P requires two separate cases to be distinguished:

1. A branch out of the region occurred recently, or
2. The IFP has rolled over zero at least once since the last branch out of the region.

When a branch out of the region is encountered, both IEP and IFP are set to location 0, the target instruction is fetched and decoded, and the zero cross (ZC) latch 213 is reset to zero. Note that IEP and IFP are trying to catch each other as illustrated in FIG. 6. In the situation illustrated in FIG. 6, it is possible that IFP reached its current position starting from 0 (after a successful branch out of the region was encountered), case 1; or that it has already made a revolution, case 2. In case 1, $P = P_1$, while in case 2, $P = P_2$.

Referring again to FIG. 4, the carry signal $C_1$ from adder 203 indicates two possibilities:

$C_1 = 1$; IFP > IEP both case 1 and case 2 are possible, or $C_1 = 0$; IFP < IEP rollover, or case 2.

Case 1 or case 2 possibilities are resolved by the ZC latch 213. If the latch is set, then case 2 is encountered; otherwise, it is case 1. The ZC latch 213 is set with the carry signal $C_2$ from adder 215 during the increment of the IEP cycle ($C_2 = 1$ during the rollover). More specifically, the $C_2$ output of adder 215 is supplied to one input of AND gate 214, and the output of AND gate 214 is connected to the set input of latch 213. AND gate 214 is enabled by the increment select (MC=0,1) so that the latch 213 can only be set during normal instruction sequencing.

Adder 215 is used to calculate the new IEP. When no branch is encountered, IEP is simply incremented by the instruction length (1,2). In order to increment the IEP for 1 or 2, the output from the IEP register 205 is fed to the right input of the adder 215, and a 1 or a 2 is fed to the left input of the adder via a multiplexer 217. The increment, 1 or 2, is selected by the multiplexer select code (MC) being 0 or 1; i.e., binary 00 or 01. When a successful branch is encountered and the target is within the IPB array 10, the target location is generated. In this case, the inputs to adder 215 are the IEP from register 205 and the branch offset BR from register 219, the latter being supplied to the adder 215 via the multiplexer 217 when MC=2 (i.e., binary 10). BR is represented as a 2's complement number and consists of a 5-bit number derived from the five least significant bits (LSB) of the instruction read into instruction register (IRG) 222 from the array 10 plus one sign bit. A third adder 221 is used to indicate whether a branch instruction is contained within the IPB array 10 or not. One input to the adder 221 is BR from register 219 and the other is P from complementing logic 211. Since P=F, the result is as follows:

$P - BR + 2$ if $BR < 0$ $P + BR - F - 1$ if $BR > 0$

The indication of the range is given by the carry-out signal C from adder by the following table:

| $C_3$ | Br > 0 | Br < 0 |
|---|---|---|
| 0 | In the range | Out of the range |
| 1 | Out of the range | In the range |

Carry out $C_3$ is exclusive ORed with the BR sign bit in exclusive NOR gate 223 so that the outside range signal IIR equals 1 when the target of the branch instruction is outside of the IPB array 10.

To summarize, if a successful branch instruction is encountered, the target address is used in conjunction with the output of adder 221 to determine whether the target instruction is contained within the IPB array 10 or not, and the new IEP is calculated (IEP') which points to the target instruction in the IPB. If it is detemined that the instruction is in the IPB array 10, IEP' is loaded into register 205. If not, registers 201 and 205 are set to zero and the ZC latch 213 is also set to 0. These operations are triggered on the branch successful signal being true.

Figure 5:
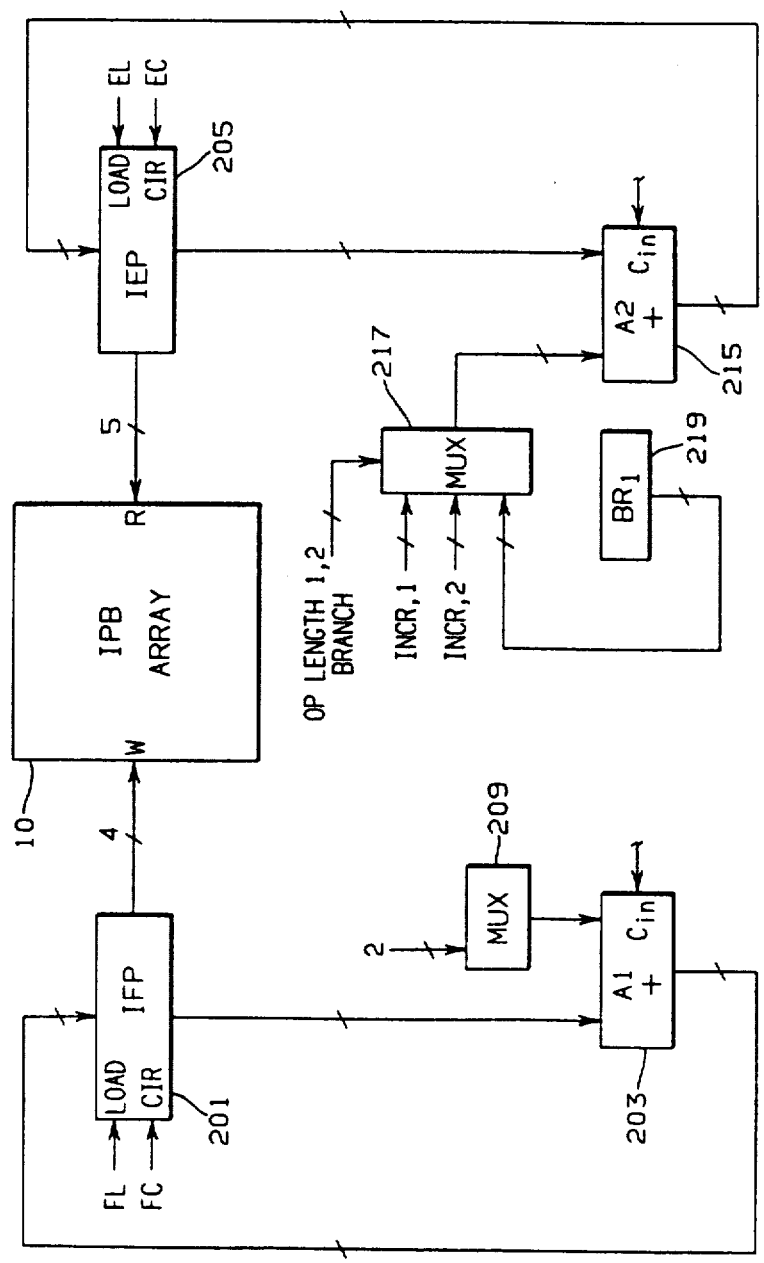
FIG. 5 is a simplified version of the block diagram of FIG. 4 showing the instruction sequencing logic.

The instruction sequencing logic is better shown in the simplified block diagram of FIG. 5. The IFP in register 201 is incremented by adding 2 to the contents of the register in adder 203. The 2 is supplied to the adder 203 via multiplexer 209. It will be recalled that the IFP is incremented by 2 because a full word (32-bits) is written into the array 10. The IEP in register 205 is incremented by adding a 1 or a 2 to the contents of the register in adder 215. The constants 1 and 2 are supplied to adder 215 via multiplexer 217. Incrementing is by 1 if the instruction is a 16-bit instruction and by 2 if the instruction is a 32-bit instruction. On the other hand, for a branch, the offset BR in register 219 is added to the contents of register 205 to produce IEP'. The multiplexer 217 responds to an input that indicates the instruction length as determined by the length determining logic 303 shown in FIG. 2 or a branch condition. The IEP load signal is generated under the following conditions:

1. IEP increment (branch not present or branch not successful), or
2. Branch successful and branch target is in the calculted IPB range.

Figure 7:
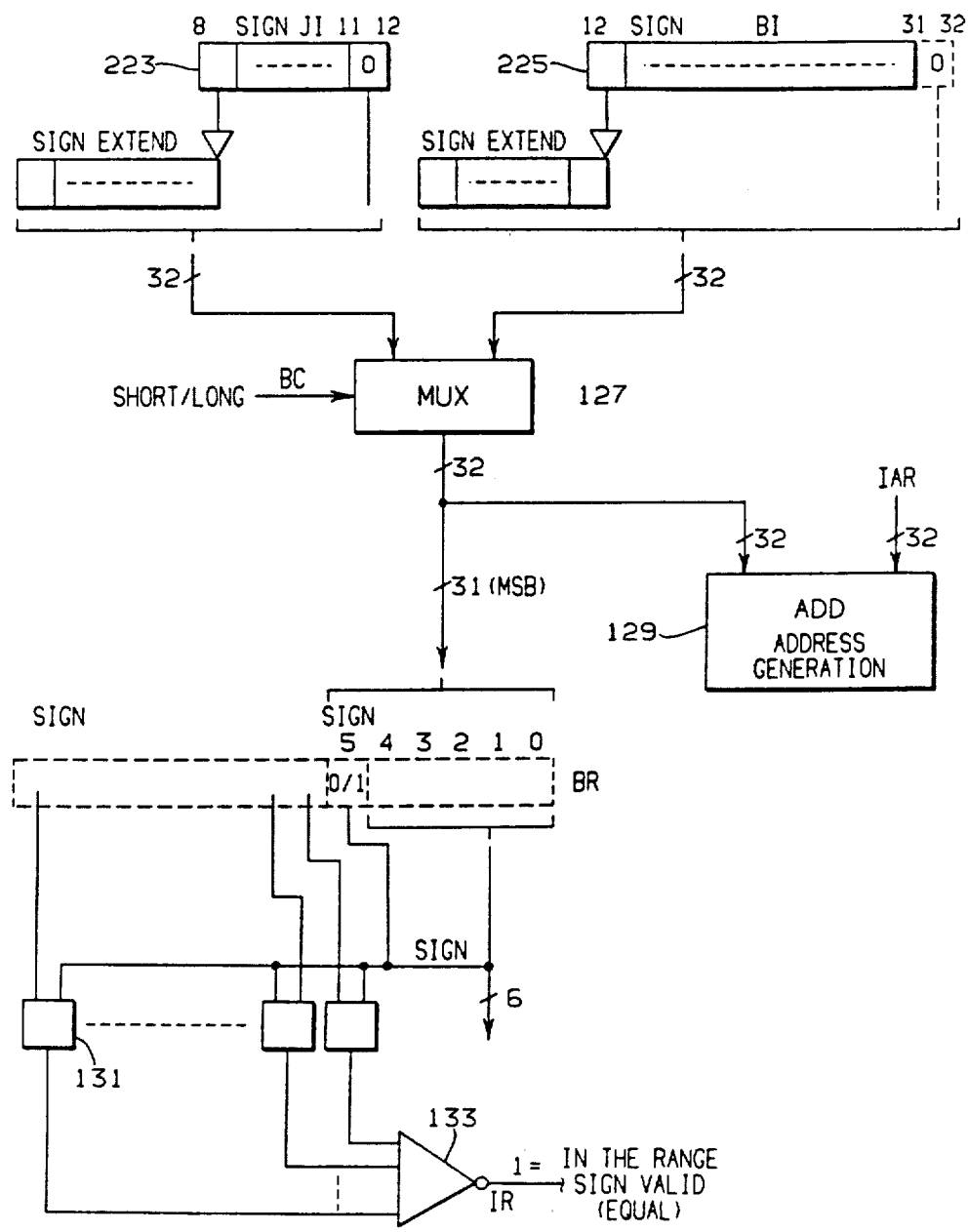
FIG. 7 is a block and logic diagram of the branch local address generation logic.

The function of the logic shown in FIG. 7 is to detect whether the Branch Target Instruction is contained in the IPB. There are two types of branches, short and long, which define the locality or range of the target. The offset fields of the Branch Instructions read into instruction register 222 in FIG. 4 are shown in FIG. 7 as being temporarily stored in registers 223 and 225. Register 223 is a one byte register containing the field JI of the target instruction, while register 225 is a three byte register containing the field BI of the branch instruction. These fields are sign-extended; e.g., the signs are duplicated to pad the fields to full 32-bit words. These sign-extended fields are then supplied to a multiplexer 127. The appropriate one of these two fields is selected with the multiplexer 127 by the BC input (depending on whether the instruction is of the short or long type as determined by the logic 303 in FIG. 2), and this offset is added to the contents of the IAR 305 (see FIG. 2) in adder 129 in order to generate the address of the target instruction. The 31 most significant bits (MSB), that is all but the least significant bit, of the multiplexer 127 are checked to determine whether this offset is smaller than 64 bytes, in which case there is a possibility that the target instruction might be contained in the IPB. This is done by comparing the sign field with Exclusive OR gates 131 to determine how long this field is. If the sign field is at least 26 bits long (leaving six bits including the least significant 32nd bit for the value), then the offset of six bits value can not exceed 64 bytes and, therefore, it is possible that this offset is in the range of −48 to +16 bytes. Since the least significant bit of the branch offset is always zero (instructions always begin on even byte or half word boundaries), the least significant bit is not taken into account. The outputs of the Exclusive OR gates 131 are connected to the inputs of NOR gate 133, and the output of NOR gate 133 indicates whether the looping logic should be disabled. That is, IR=0 indicates that the Branch Target is certainly out of the range; conversely, IR=1 enables the looping logic. This check is performed in parallel with the Branch Address Generation, and if a match is found indicating that the instruction exists in the IPB, the request for the fetch from this memory location is not activated. Instead, the instruction is taken from the IPB.

The implementation shown in FIG. 7 is only one of the possible implementations, and those skilled in the art should understand that FIG. 7 is illustrative of the principles of operation. However, actual implementation depends on the particular case; i.e., machine structure and orginization.

Figure 8:
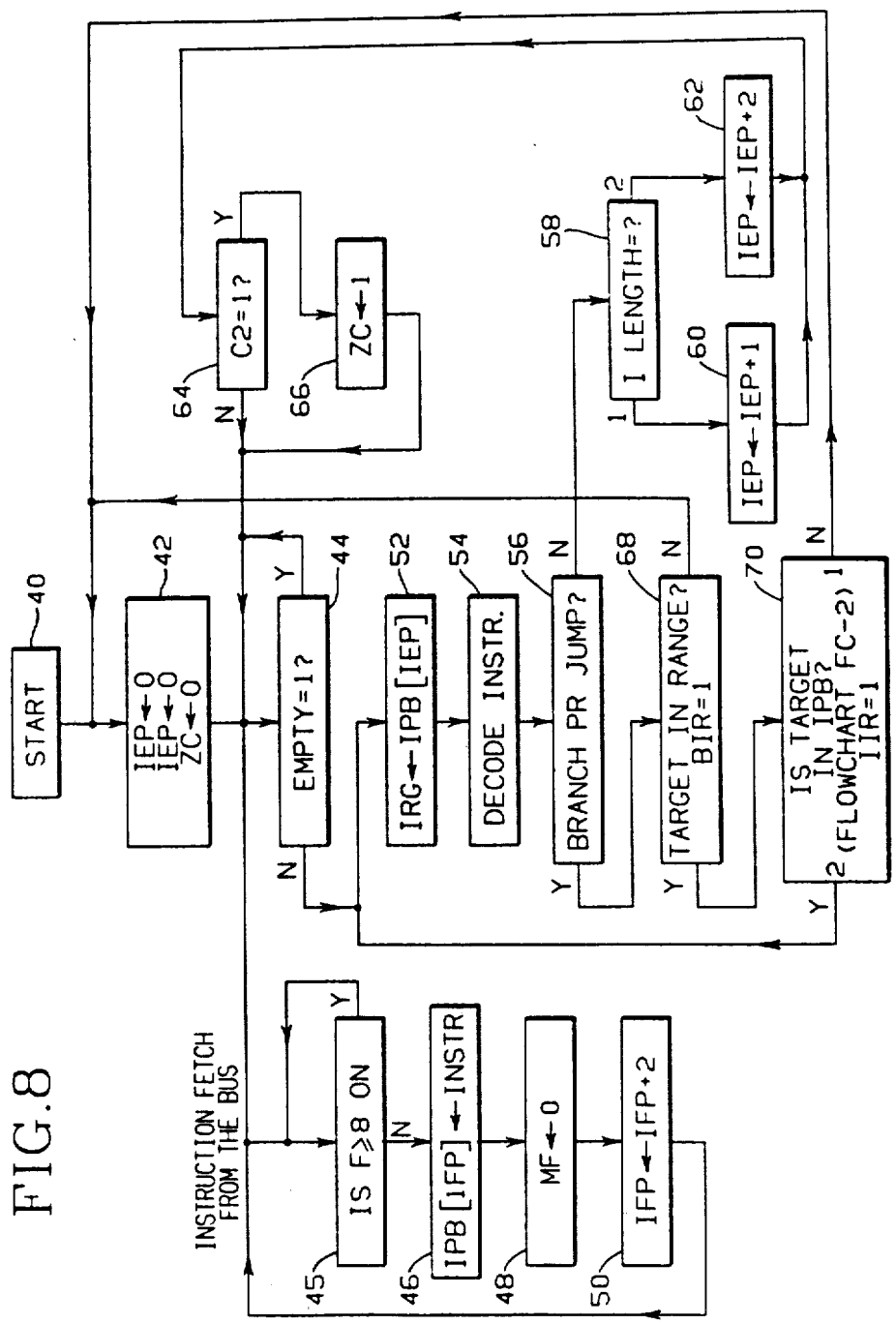
FIG. 8 is a flow chart illustrating the function of the instruction prefetch buffer control according to the invention.

The flow chart of FIG. 8 illustrates the function of the IPB control according to the invention. The process is entered at block 40, and the first operation, as indicated in block 42 is to initialize the IFP, IEP and ZC to zero. That is, registers 201 and 205 are all set to zero. Then, in decision block 44, a test is made to determine if the IPB is empty. This test is performed by the comparator 208 which compares the IFP and the IEP in registers 201 and 205 to determine if they are equal. Equality is the indication that the IPB is empty. Initially, the IPB is empty because the registers were initialized to zero in block 42. Therefore, a determination is made in decision block 44 that the IPB is empty, and an instruction fetch from the bus is made. This is accomplished in block 46 by reading the instruction into the IPB array 10 at address IFP. Then, in block 48, the select signal MF for multiplexer 209 is set to zero, and in block 50, IFP is incremented by 2. The incrementing of IFP by 2 is performed by adder 203. Now, when the test is made in decision block 48 to determine if the IPB is empty, it will be assumed that the test is negative.

In this case, the instruction in the IPB array 10 identified by the IEP pointer in register 205 is read to the instruction register IRG 222 as indicated by block 52. The instruction is decoded in block 54, and then in decision block 56, it is tested to determine if it is a branch or jump instruction. Assuming first that it is not a branch or jump instruction, a determination is made in decision block 58 as to the length of the instruction; i.e., whether it is a 16-bit or a 32-bit instruction. This is the function of the instruction length logic 303 in FIG. 2. If the instruction is a 16-bit instruction, then in block 60 the IEP pointer in register 205 is incremented by 1. On the other hand, if the instruction is a 32-bit instruction, the IEP pointer in register 205 is incremented by 2 as indicated by block 62. These functions are accomplished by the adder 215 and the multiplexer 217. In either case, the carry output of adder 215 is checked in decision block 64 to determine if there is a carry. If so, the zero cross latch 213 is set as indicated in block 66; otherwise, it is not. The process then loops back, and the steps described are repeated.

Returning now to decision block 56, assume now that the result of the test is positive; that is, the decoded instruction is a branch or jump instruction. In this case, a test is made in decision block 68 to determine if the target instruction is in range. As will be recalled, this is the function of the logic shown in FIG. 7. A logic 1 output of the NOR gate 133 indicates a positive result of the test, and this will result in a test being made in decision block 70 to determine if the target is in the IPB array 10. This process is described in more detail with reference to the flow chart in FIG. 9, but for now, suffice it to say that this determination is based on the output of the exclusive NOR gate 223 in FIG. 4 which receives as inputs the carry output of adder 221 and the sign from BR register 219. As will become apparent, if the test in decision block 70 is positive, the process loops back to block 52 to read the branched to instruction out of the IPB array. If the target instruction is not in the IPB array, that is the test in decision block 70 is negative, then the process loops back to decision block 44 to test for the condition of the IPB array being empty. However, prior to the test in decision block 70, if the test in decision block 78 was negative, then the process loops back to block 42 to re-initialize the registers 201 and 205 and the latch 213.

Turning now to the flow chart of FIG. 9, the process of the test made in decision block 70 is shown in more detail. The process is entered at block 72 and immediately branches. On the one hand, the MC input to multiplexer 217 is set to 2 (i.e., binary 10) to select the BR register 219 as an input to the adder 215. Adder 215 then computes the target address by adding the contents of the registers 205 and 219. Whether the result is stored in register 205 is determined by the parallel processing on the left side of the flow chart. In this parallel processing, the 1's complement of the contents of register 205 is added to the contents of register 201 in adder 203 to produce an output as indicated in block 78. The carry output is then tested in decision block 80 to determine if there was a rollover. If not, the zero cross latch 213 is tested in decision block 82 to determine if there was a recent branch. If there was, then the contents of the IEP register 205 are taken as P, as indicated in block 86. On the other hand, if the results of either of the tests in decision blocks 80 or 82 are negative or the result of the test in decision block 84 is positive, then in block 88, the sum output of adder 203 is complemented in complementing logic 211 and this is taken as P. It will be recalled that P is intrepreted in this way to distinguish between the two cases of a branch the first being that a branch out of the region occurred recently and the second being that the IFP has rolled over zero at least once since the last branch out of the region. In either case, the most significant bit (MSB) of P is set to the sign in the BR register 219, as indicated in block 90 and as shown in FIG. 4. Adder 221 then sums P and BR in block 92. The sign of BR is checked in decision block 94 to determine if it is zero. If it is not, the carry output of adder 221 is tested to determine if it is a one in block 95, but if it is, the carry output of adder 221 is tested to determine if it is a zero in block 96. A negative result from either of decision blocks 95 and 96 is the negative output of decision block 70 of FIG. 8. Both of these tests are performed by exclusive NOR gate 223 in FIG. 4. On the other hand, a positive result from either of the tests made in decision blocks 95 or 96 results in the sum output of adder 215 being stored in IEP register 205. This is the positive output of the decision block 70 of FIG. 8.

While the invention has been particularly shown and described with respect to a preferred embodiment thereof, it will be understood by those skilled in the art that changes may be made in form and detail without departing from the spirit and scope of the invention.

Having thus desribed our invention, what we claim as new, and desire to secure by Letters Patent is:

1. A method of controlling an instruction prefetch buffer that stores the code for a number of instructions that have already been executed as well as the code for a number of instructions yet to be executed, said method comprising the steps of:

storing an instruction fetch pointer which is supplied to said buffer as a write pointer that points to the location where a new word is to be written into the buffer;

writting instructions into said buffer at the locations pointed to by said instruction fetch pointer;

storing an instruction execution pointer which is supplied to said buffer as a read pointer that points to the location from which an instruction is to be read from the buffer;

reading instructions from locations in the buffer pointed to by said instruction execution pointer;

decoding each instruction read from the buffer to determine if it is a branch or jump instrustion;

determining if a target instruction of a branch or jump instruction is within a range of instructions which may be stored in the buffer;

determining for those target instructions found to be within said range if the target instruction is in the buffer; and setting the instruction execution pointer to the location of the target instruction found to be in the buffer, said target instruction being either preceding or following a current instruction in the buffer.

2. The method recited in claim 1 wherein the instruction prefetch buffer stores instructions of variable lengths, said method further comprising the step of determining the length of an instruction read out of the buffer and incrementing the instruction execution buffer according to the length of the instruction if the instruction is not a branch or jump instruction.

3. The method recited in claim 2 further comprising the steps of:

setting the instruction fetch pointer and the instruction execution pointer to zero if the instruction read out of the buffer is a branch or jump instruction and the target instruction is not within said range; and reading the next instruction from a main memory storing instructions to a location in said buffer pointed to by said fetch pointer.

4. The method recited in claim 3 further comprising the steps of:

testing for the condition of equality of the instruction fetch pointer and the instruction execution pointer as an indication that the buffer is empty; and reading a next instruction from said main memory if the buffer is empty.

5. An instruction prefetch buffer control for buffer means that stores the code for a number of instructions that have already been executed as well as the code for a number of instructions yet to be executed, said instruction prefetch buffer control comprising:

first register means for storing an instruction fetch pointer, said instruction fetch pointer being supplied to said buffer means by said first register means as a write pointer which points to the location where a new word is to be written into said buffer means;

second register means for storing an instruction execution pointer, said instruction execution pointer being supplied to said buffer means by said second register means as a read pointer which points to the location in said buffer means where a word is to be read from said buffer means;

decoding means for decoding an instruction read from said buffer means to determine if that instruction is a branch or jump instruction;

first adder means for incrementing said first register means to increment said instruction fetch pointer for sequential instructions, said first adder means calculating a new instruction fetch pointer for branch or jump instructions;

second adder means for incrementing said second register means to increment said instruction execution pointer for sequential instructions, said second adder means calculating a new instruction execution pointer for branch or jump instructions;

first logic means responsive to said decoding means for determining if a target instruction of a branch or jump instruction read from said buffer means is within a range of instructions which may be in said buffer means; and second logic means for determining if a target instruction found to be within said range is in said buffer means, said second logic means including third adder means responsive to said first adder an a branch target address to calculate whether the target instruction is contained in said buffer means and, if it is, causing the new instruction execution pointer calculated by said second adder means to be loaded into said second register means.

6. The instruction prefetch buffer control recited in claim 5 wherein said buffer means stores instructions of variable length, further comprising length means for determining the length of an instruction read out of said buffer means, said second adder means being responsive to said length determining means for incrementing said instruction execution pointer according to the length of the instruction read out of said buffer means.

7. The instruction prefetch buffer control recited in claim 6 further comprising means responsive to said first and second logic means for setting said first and second registers to zero if the target instruction is not within said range or, if within said range, not in said fuffer means, whereby said fetch pointer pointer to an initial location in said buffer means where a new word is to be written into said buffer means.

8. The instruction prefetch buffer control recited in claim 7, further comprising comparing means connected to said first and second register means for determining the condition of equality of the instruction fetch pointer and the instruction execution pointer as an indication that said buffer means is empty, said comparing means causing an instruction to be read from a main memory storing instructions.

* * * * *